United States Patent
Stewart (10) Patent No.: US 10,421,024 B2
(45) Date of Patent: Sep. 24, 2019

(54) PLUSH STANDING DOLL AND BACKPACK DOLLHOUSE

(71) Applicant: Elaine Stewart, New York, NY (US)

(72) Inventor: Elaine Stewart, New York, NY (US)

(*) Notice: Subject to any disclaimer, the term of this patent is extended or adjusted under 35 U.S.C. 154(b) by 0 days.

(21) Appl. No.: 15/040,843

(22) Filed: Feb. 10, 2016

(65) Prior Publication Data

US 2016/0325193 A1 Nov. 10, 2016

Related U.S. Application Data

(60) Provisional application No. 62/115,997, filed on Feb. 13, 2015.

(51) Int. Cl.
| | |
|---|---|
| A63H 3/04 | (2006.01) |
| A63H 3/02 | (2006.01) |
| A63H 3/52 | (2006.01) |
| A63C 17/12 | (2006.01) |
| B60L 15/20 | (2006.01) |
| A63C 17/00 | (2006.01) |
| A63C 17/01 | (2006.01) |
| B60L 50/60 | (2019.01) |

(52) U.S. Cl.
CPC ........... *A63H 3/04* (2013.01); *A63C 17/0046* (2013.01); *A63C 17/013* (2013.01); *A63C 17/015* (2013.01); *A63C 17/12* (2013.01); *A63H 3/02* (2013.01); *A63H 3/52* (2013.01); *B60L 15/20* (2013.01); *B60L 50/66* (2019.02); *B60L 2200/24* (2013.01); *B60L 2220/44* (2013.01); *B60L 2260/28* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(58) Field of Classification Search
CPC ... A63H 3/00; A63H 3/02; A63H 3/04; A63H 3/52; A63H 33/004; A63H 33/42; A45F 4/02
See application file for complete search history.

(56) References Cited

U.S. PATENT DOCUMENTS

| | | | | |
|---|---|---|---|---|
| 1,002,363 A | * | 9/1911 | Bell | A63H 3/02 446/370 |
| 1,409,411 A | * | 3/1922 | Rogers | A63H 3/04 446/374 |

(Continued)

FOREIGN PATENT DOCUMENTS

| | | | |
|---|---|---|---|
| JP | 3185444 U | * | 8/2013 |
| JP | 3185444 U | * | 8/2013 |

OTHER PUBLICATIONS

Translation JP3185444U.*

*Primary Examiner* — Eugene L Kim
*Assistant Examiner* — Alyssa M Hylinski
(74) *Attorney, Agent, or Firm* — Lawrence B. Goodwin, PLLC (57) ABSTRACT

A plush standing doll having a head and torso joined with arms and hands and legs and feet. Plush standing doll has the ability stand upright without falling over due to the internal frame which supports the doll. Backpack dollhouse is a backpack that converts into a dollhouse play area for plush standing doll, it is made with a detachable pouch that can be used to transport plush standing doll when the whole backpack dollhouse is not needed.

4 Claims, 7 Drawing Sheets

(56) References Cited

U.S. PATENT DOCUMENTS

| | | | | | |
|---|---|---|---|---|---|
| 1,551,250 | A | * | 8/1925 | Henry | A63H 3/04 223/66 |
| 1,590,898 | A | * | 6/1926 | McAuley | A63H 3/04 428/28 |
| 4,094,093 | A | * | 6/1978 | Kaelin | A63H 3/02 446/371 |
| 4,123,872 | A | * | 11/1978 | Silva | A63H 3/04 428/16 |
| 4,968,281 | A | * | 11/1990 | Smith | A63H 3/02 446/369 |
| 5,332,093 | A | * | 7/1994 | Littlepage | A45C 7/0095 190/102 |
| 5,516,314 | A | * | 5/1996 | Anderson | A63H 3/04 446/268 |
| 5,762,531 | A | * | 6/1998 | Witkin | A63H 3/04 446/370 |
| 7,892,064 | B2 | * | 2/2011 | Carruth | A63H 33/00 190/109 |
| D702,434 | S | * | 4/2014 | Chalk | D3/216 |
| 2002/0100777 | A1 | * | 8/2002 | Zheng | A45C 15/00 224/153 |
| 2002/0139820 | A1 | * | 10/2002 | Godshaw | A45F 3/04 224/153 |
| 2002/0185508 | A1 | * | 12/2002 | Clark | A45F 3/04 224/652 |
| 2003/0124948 | A1 | * | 7/2003 | Ostolaza | A45C 9/00 446/75 |
| 2004/0266316 | A1 | * | 12/2004 | Li | A63H 3/52 446/478 |
| 2005/0279794 | A1 | * | 12/2005 | Gerchen | A45F 3/042 224/576 |
| 2007/0045370 | A1 | * | 3/2007 | Hsieh | A45C 5/14 224/576 |
| 2007/0175941 | A1 | * | 8/2007 | Berry | A45C 7/0077 224/583 |
| 2009/0111354 | A1 | * | 4/2009 | Zheng | A47C 3/16 446/369 |
| 2015/0157113 | A1 | * | 6/2015 | Anelevitz | A45F 3/04 224/576 |
| 2016/0213132 | A1 | * | 7/2016 | Ford | A45C 3/12 |

* cited by examiner

PLUSH STANDING DOLL AND BACKPACK DOLLHOUSE

CROSS-REFERENCE TO RELATED APPLICATION

This application claims the benefit of U.S. provisional application 62/115,997, filed Feb. 13, 2015.

BACKGROUND OF THE INVENTION

1. Field of the Invention

The present invention relates to a plush standing doll that is created to stand up right on their own two feet unassisted with body parts, legs and arms that are flexible and adaptable to various positions. The backpack dollhouse is a backpack with sections that converts into a dollhouse that the plush standing doll can fit into and serves as an accessory that the doll can be carried around in.

2. Description of the Related Art

While there are plush stuffed dolls being manufactured and offered to the public there is nothing with the same characteristics and features of plush standing doll. Plush dolls have always been thought of as soft and cuddly and have the ability to bring comfort, fun and joy.

However cuddly and soft plush dolls maybe they lack the life like qualities found in dolls made from plastic or some other firmer materials that allows the doll the ability to stand upright unassisted, flex its limbs and provide a child with a more lifelike doll or imaginary playmate. Plush standing doll is created to provide the same soft cuddly comfort, fun and joy as traditional plush dolls but with characteristics and features found in dolls made from firmer materials.

As too backpack dollhouse it does not exist at all. The classic backpack an important accessory for children and adults alike are manufactured to hold and carry ones must have possessions without having to leave them behind. Backpack dollhouse is created for the child who wants to take their plush standing doll with them to a play date or just have the doll with them due to an innate love of play. The doll can easily be transported in backpack dollhouse without interfering with other items in the backpack as it has the added feature of converting certain sections into a dollhouse when at play and back to a classic backpack accessory when needed.

SUMMARY OF THE INVENTION

The object of the present invention is to provide a plush stuffed standing doll with the ability to stand upright unassisted without flopping or falling over and with body parts that are flexible and adaptable to various positions. Another object of plush standing doll is to provide an internal frame that will allow the doll to stand upright unassisted with the ability to flex its limbs. Yet a further object of plush standing doll is to present a plush stuffed doll that is made of simplified construction and can be economically manufactured.

Another object of the invention is backpack dollhouse created to provide a suitable dollhouse and accessory for carrying plush standing doll in that will allow a child to still carry the ubiquitous backpack as if it was the classic backpack but in fact it will have a dual purpose that will function as a backpack when needed but can also serve as a dolls playhouse. When utilized as a dollhouse it will have the ability to carry not only plush standing doll but any accessories that the doll may have as well. Therefore giving the child endless possibilities for playing with plush standing doll in a dollhouse environment even when the child is away from home where most doll playhouses are usually kept.

While plush standing doll and backpack dollhouse are invented to complement each other they may be bought and sold to the public either together or separate and can also be manufactured separately as well.

Other objects and features of the present invention can be found in the detailed description and accompanying drawings. It is to be understood that the drawings are designed solely for purposes of illustration and not as a definition of the limits of the invention for which reference should be made to in the appended claims. It should further be understood that the drawings are not necessarily drawn to scale and that unless otherwise indicated, they are intended to conceptually illustrate the invention.

DETAILED DESCRIPTION OF THE INVENTION

Figure 1:
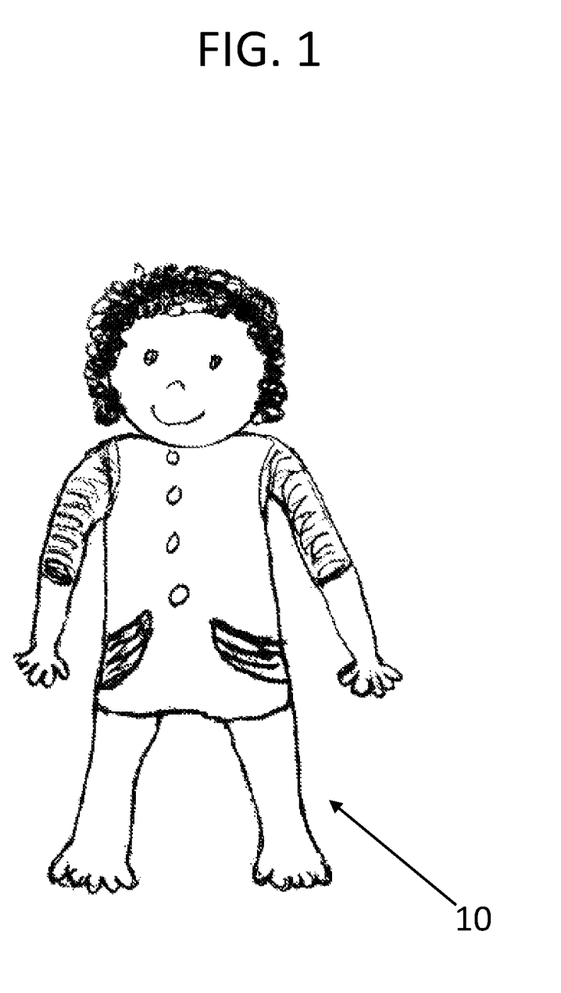
FIG. 1 shows a complete view of plush standing doll.

FIG. 1 plush standing doll reference number 10 according to the present invention. The doll 10 of FIG. 1 is depicted as a female but the doll 10 according to the invention is not limited to any gender or character. Alternatively, the doll 10 according to the present invention may embody more fanciful characters such as superheroes and well known characters actual or fictional, past or present. The height of the doll is not limited to any specific range but will be made small enough to comfortably fit into backpack dollhouse and for that purpose the dolls size range will be approximately three to five inches tall; though plush standing doll is not limited to any one size or size range. The doll 10 will consist of a head, torso, arms, hand, legs and feet as depicted in FIG. 1.

Figure 2:
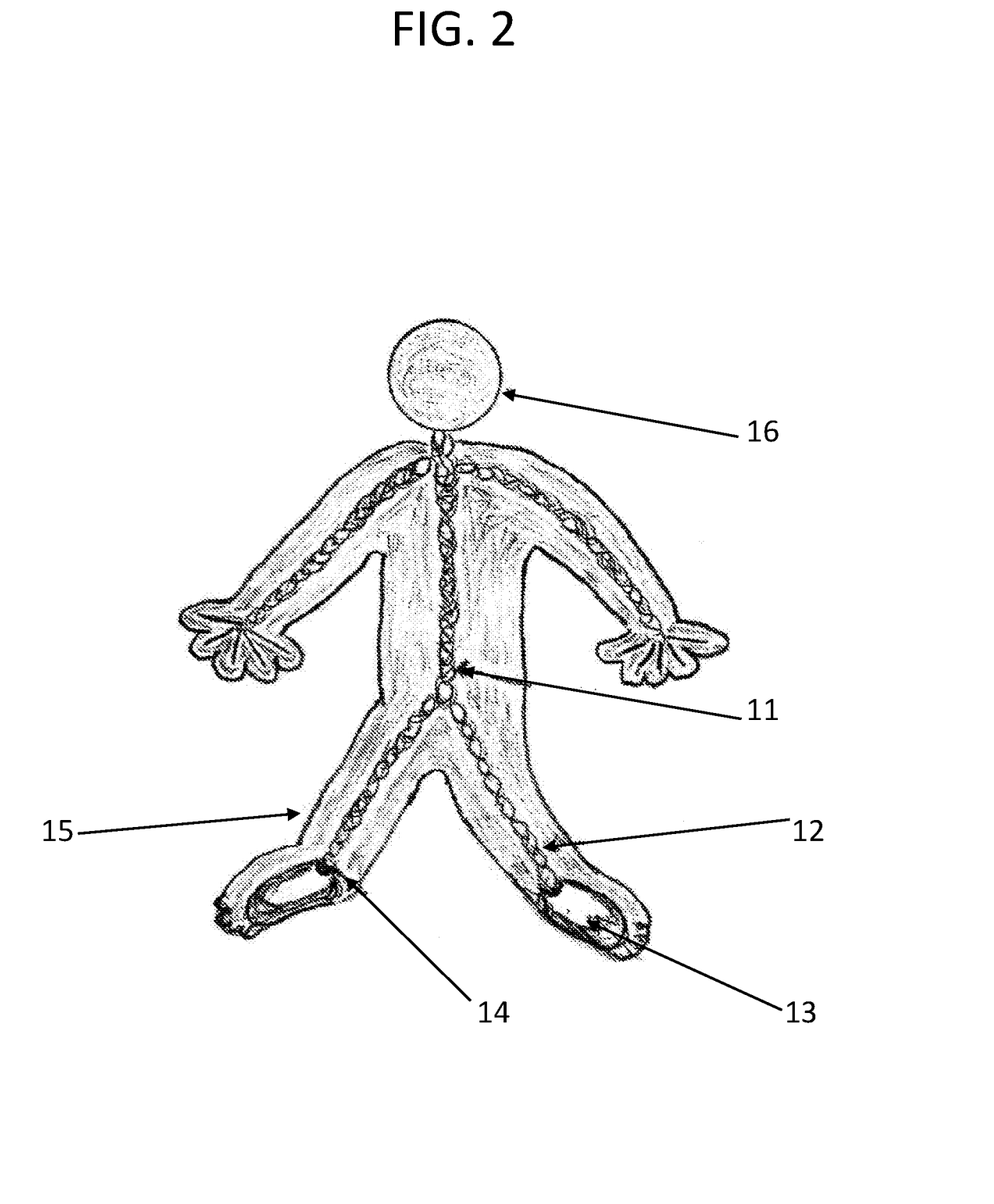
FIG. 2 shows internal view of plush standing doll.

FIG. 2 shows internal view that gives strength and shape to doll 10 and provides it with the ability to stand upright unassisted and to flex its limbs. The internal frame mentioned number 11 will be preferably made of wire, pipe cleaners or another pliable product that will be pliable enough to allow the limbs flexibility but strong enough to hold the weight of the doll including the stuffing and firm enough to allow the doll to stand upright on its own two feet unassisted. The doll stuffing 12 can be any soft materiel that can be wrapped around or otherwise attached to the frame without encumbering the dolls ability to stand upright alone or restrict the flexibility of the dolls limbs. The doll will have the ability to stand upright due to the internal frame 11 and a firm material such as cork or wood though not limited to either will serve as the dolls feet 13 and will support the finished doll. The internal frame 11 will then be attached to the feet 13 as depicted in 14 this attachment will be glued, soldered, nailed or otherwise attached so as to provide the needed strength for the finished doll and to provide a long lasting product. Once the internal frame 11, the hard material feet 13 and the best decided upon stuffing are 12 are all assembled the doll 10 will then have fabric skin 15 added to it; in order for plush standing doll to have a soft and cuddly touch the dolls fabric skin will be made of a soft fabric such as velour, terry or some other plush fabric but not limited to either. The dolls head 16 which will be made of the same or similar materials as the body will then be attached.

Figure 3:
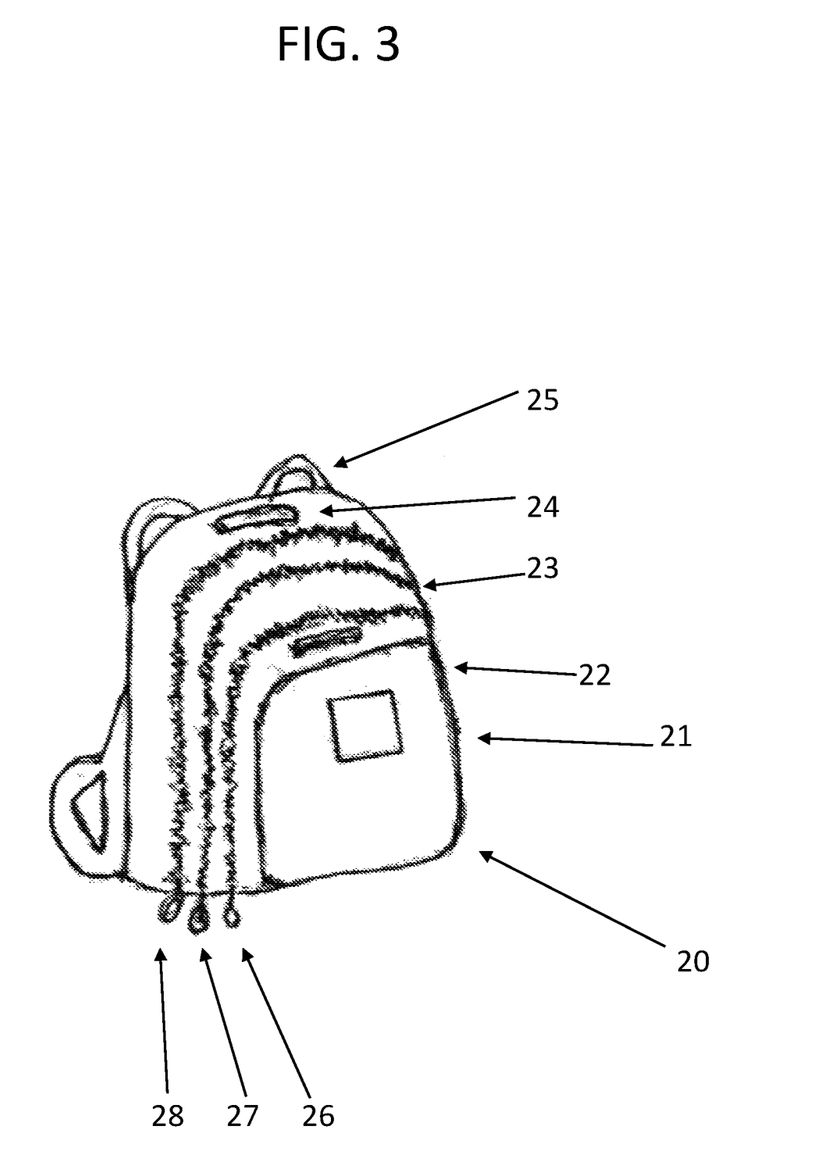
FIG. 3 shows complete view of backpack dollhouse.

FIG. 3. Shows closed backpack dollhouse 20 and it identifies the various components of backpack dollhouse. Which are as follows, 21 indicates the detachable pouch for which there will be a more detailed view in FIG. 5. The backpack dollhouse interior pocket and doll play area are indicated by 22 and 23, backpack dollhouse handle 24 is followed by backpack dollhouse shoulder straps 25. Backpack dollhouse zippers are as follows, detachable pouch zipper 26, interior pocket zipper 27 and doll play area and accessories storage area 28.

Figure 4:
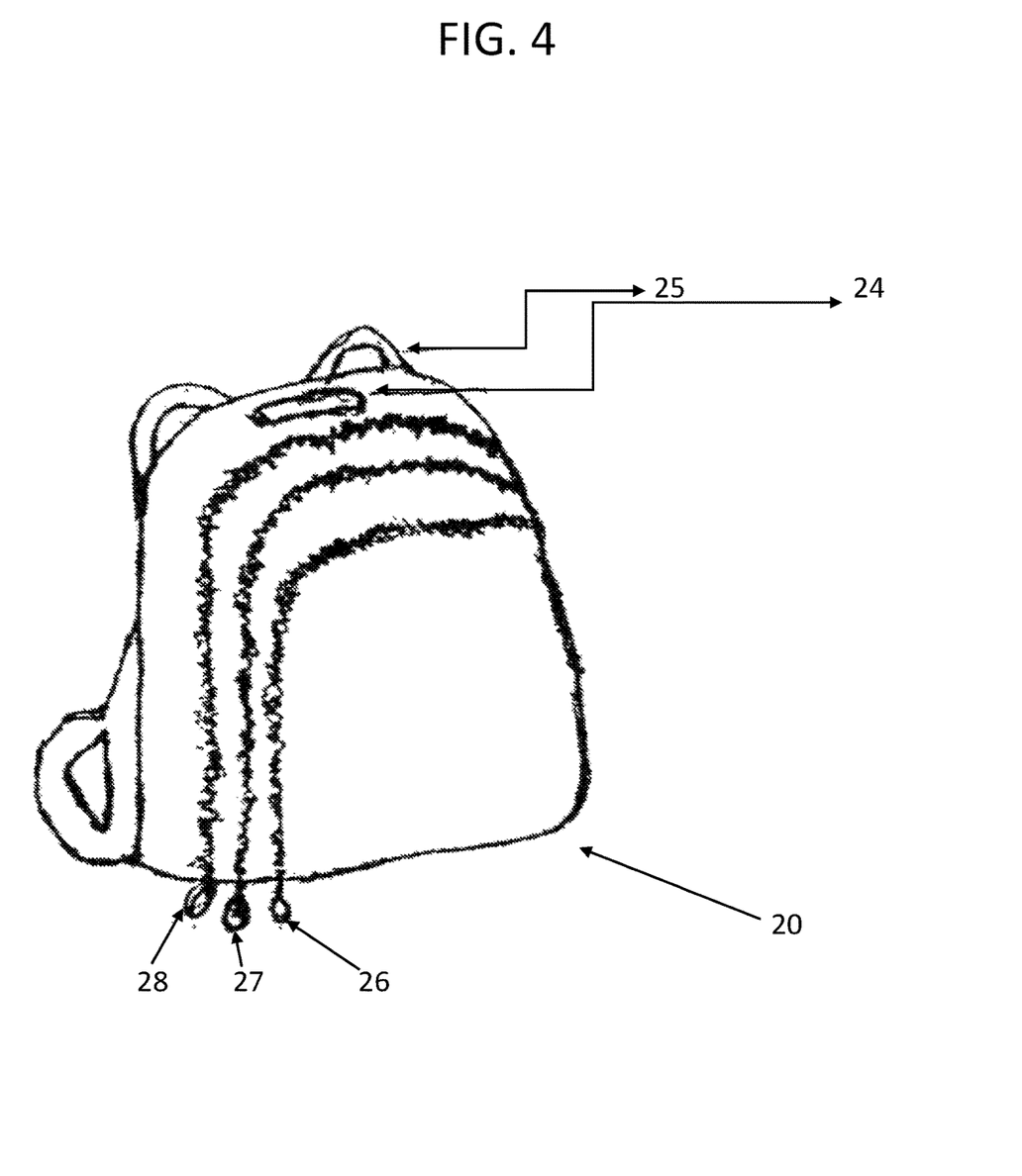
FIG. 4 shows backpack dollhouse with detachable pouch unzipped and removed from backpack dollhouse.
Figure 5:
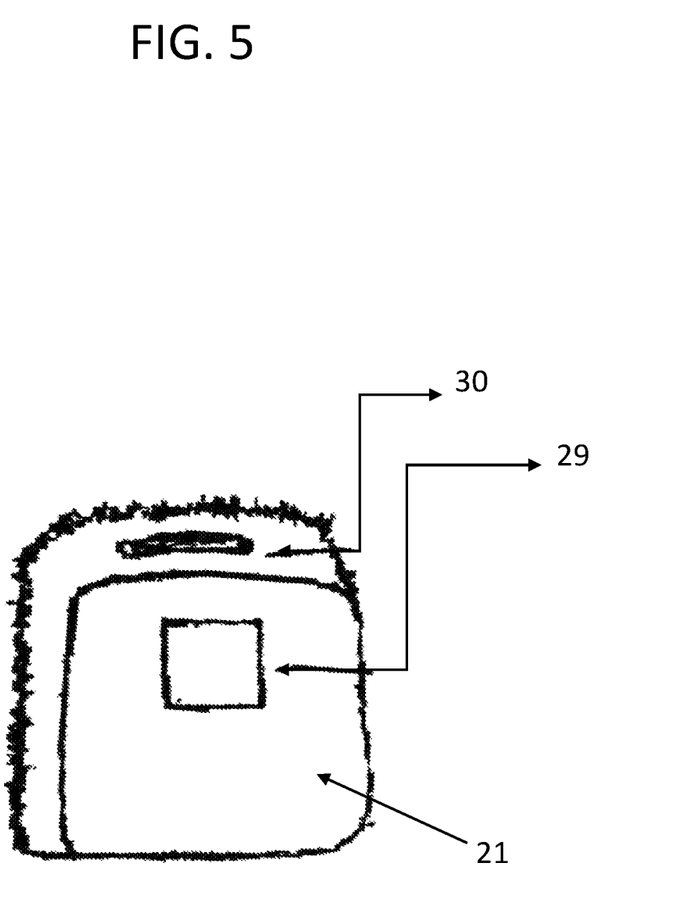
FIG. 5 shows detached pouch with highlighted attributes.

FIG. 4. Shows backpack dollhouse 20 with pouch unzipped and removed from backpack. FIG. 5 shows the removed pouch 21 with its labeled components 29 indicates a clear window that will be made of vinyl or another clear see through material. The detachable pouch may hold plush standing doll when it is being transported and therefore a clear material will have the same purpose and effect as a window would have allowing the doll to look out of the window, 30 shows detachable pouch handle that makes the pouch easy to carry when it is detached from backpack dollhouse.

Figure 6:
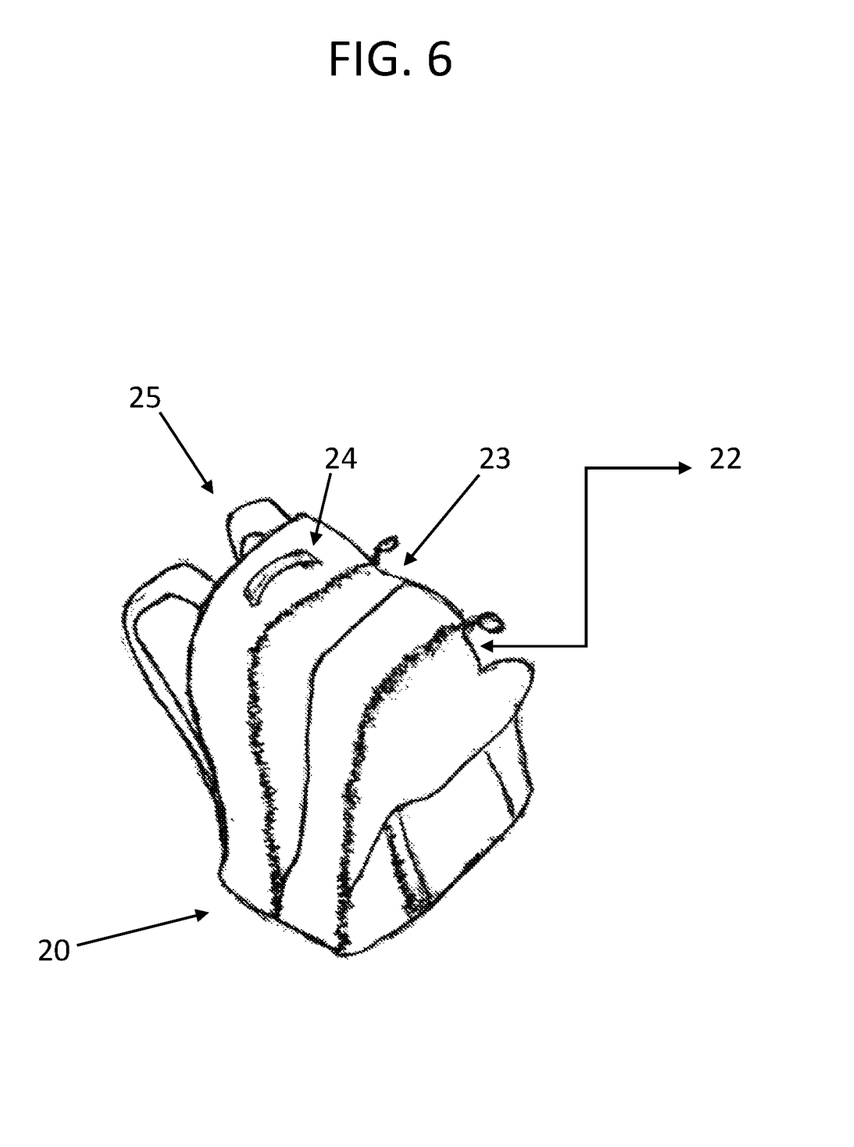
FIG. 6 shows backpack dollhouse with unzipped interior pocked and unzipped doll play area and accessories storage.
Figure 7:
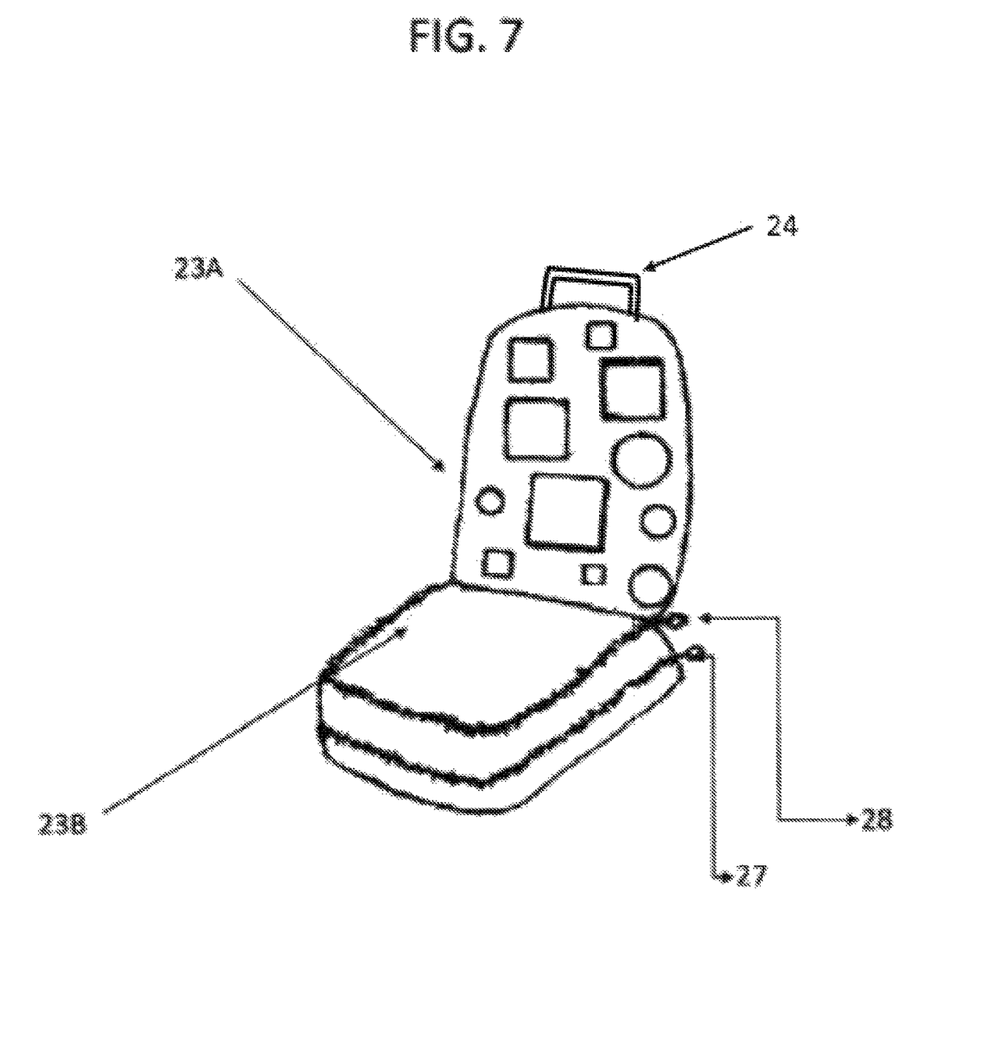
FIG. 7 shows open view of backpack dollhouse play area and accessories storage area.

FIG. 6 shows backpack dollhouse unzipped interior pocket 22 and unzipped doll play area and accessories storage area 23. FIG. 7 shows backpack dollhouse open view 23A indicates the top portion of backpack dollhouse that shows individual pockets and draws that will used for doll accessories, furnishings and storage, 23B shows inside view of doll play area.

I claim:
1. A plush doll comprising:
   a. a body including a head, a torso, a pair of arms, a pair of hands, a pair of legs and a pair of feet, the body being sized to fit within a child's backpack, said feet extending laterally outward at an angle relative to said legs;
   b. a frame (i) attached to said feet, (ii) disposed within the torso, arms and legs, and (iii) made of a pliable material that is both flexible and strong, to thereby provide support to allow the doll to both stand upright and flex its torso, arms and legs;
   c. said feet consisting of a hard, firm material that will allow the doll to stand upright without falling over, said material selected from the group consisting of wood and cork;
   d. fabric, forming the skin of the doll, covering the entire doll, including the head, torso, arms, legs, hands and feet of the doll,
   e. stuffing material disposed within said fabric and wrapped around said frame to thereby give shape and plush characteristics to the doll;
   f. wherein the head, torso, arms, hands and legs are made from substantially the same materials.
2. The plush doll of claim 1 wherein the feet are formed of wood.
3. The plush doll of claim 1 wherein the feet are formed of cork.
4. In combination, a backpack dollhouse and plush doll, wherein said backpack dollhouse comprises:
   a. a main backpack portion, including, (i) on an interior thereof, pockets adapted for the storage of doll accessories, (ii) a handle at a top thereof and (iii) shoulder straps on an exterior side thereof;
   b. a dollhouse play portion connected to the main backpack portion by a first zipper, said dollhouse play portion adapted to provide a dollhouse play area on a surface thereof;
   c. an interior pocket portion connected to the dollhouse play portion by a second zipper; and
   d. a detachable pouch detachably connected to the interior pocket portion by a third zipper;
   wherein, when the backpack is in an upright position:
      i. the first, second and third zippers define three substantially parallel vertical planes when the zippers are fully closed;
      ii. when the first zipper is opened, and the dollhouse play portion is rotated downwardly and away from the main backpack portion to a substantially horizontal orientation, said dollhouse play area is presented on a substantially horizontal surface of the dollhouse play portion, and said pockets adapted for the storage of doll accessories are presented on the interior of the main backpack portion;
      iii. when the second zipper is opened, an interior pocket is provided for storing play items; and
      iv. when the third zipper is opened, the detachable pouch may be removed from the interior pocket portion;
   and wherein said plush doll comprises:
      a. a body including a head, a torso, a pair of arms, a pair of hands, a pair of legs and a pair of feet, the body being sized to fit within said backpack dollhouse;
      b. a frame (i) attached to said feet, (ii) disposed within the torso, arms and legs, and (iii) made of a pliable material that is both flexible and strong, to thereby provide support to allow the doll to both stand upright and flex its torso, arms and legs;
      c. said feet consisting of a hard, firm material that will allow the doll to stand upright without falling over;
      d. fabric, forming the skin of the doll, covering the entire doll, including the head, torso, arms, legs, hands and feet of the doll,
      e. stuffing material disposed within said fabric and around said frame to thereby give shape and plush characteristics to the doll;
      f. wherein the head, torso, arms, hands and legs are made from substantially the same materials.

* * * * *